April 7, 1942. A. MUSHER 2,278,466
QUICKLY DISINTEGRATABLE BONDED FOOD UNITS AND METHODS OF MAKING THEM
Filed April 28, 1939 2 Sheets-Sheet 1
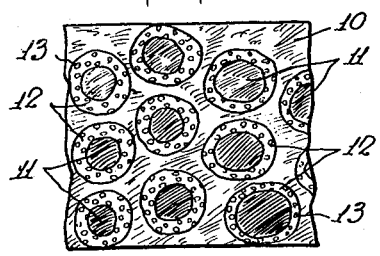
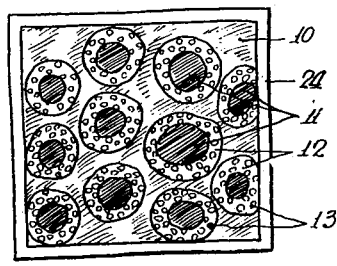
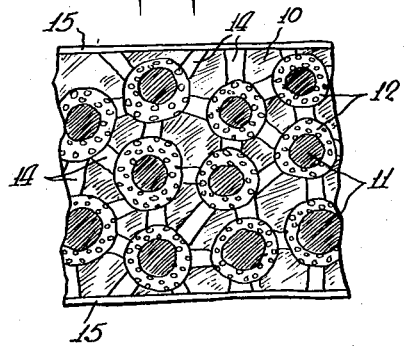
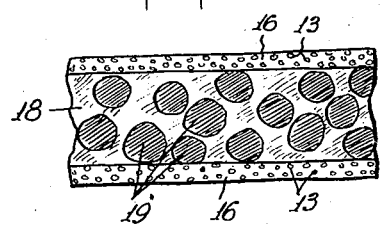
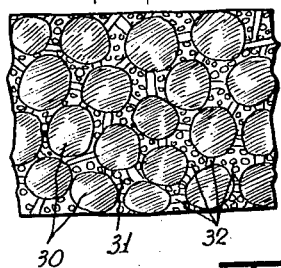
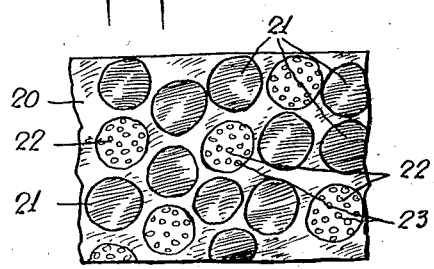
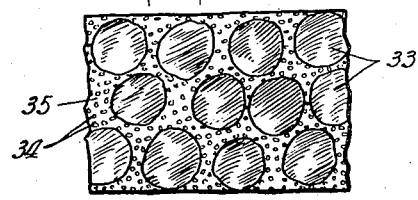
INVENTOR
*Albert Musher*
BY
ATTORNEY April 7, 1942. A. MUSHER 2,278,466
QUICKLY DISINTEGRATABLE BONDED FOOD UNITS AND METHODS OF MAKING THEM
Filed April 28, 1939 2 Sheets-Sheet 2
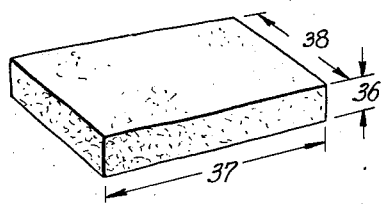
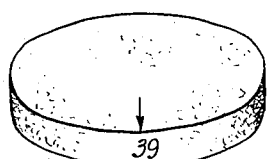
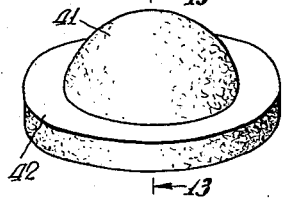
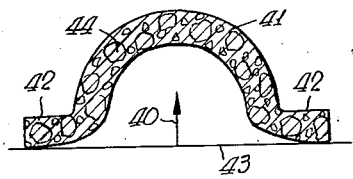
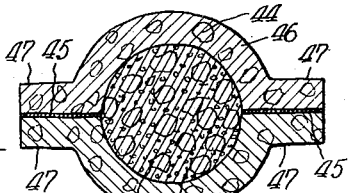
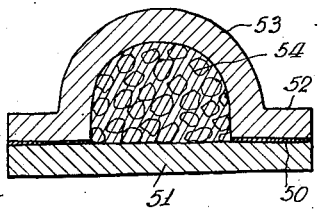
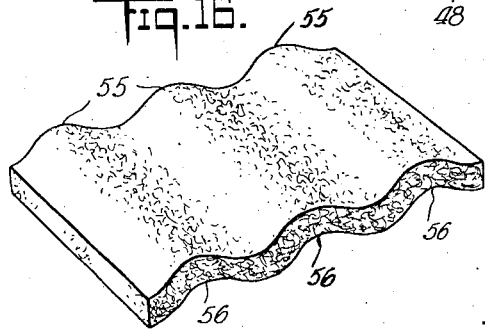
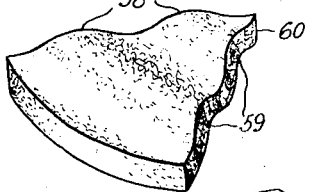
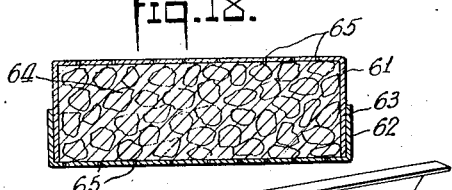
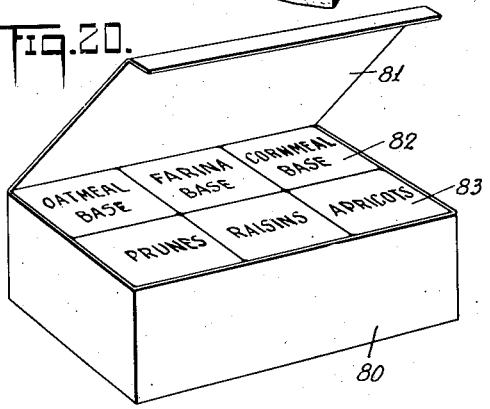
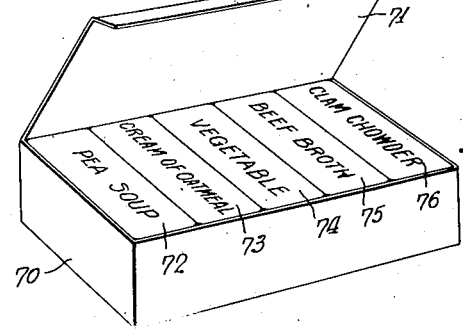
INVENTOR
Albert Musher
BY
ATTORNEY Patented Apr. 7, 1942

2,278,466

UNITED STATES PATENT OFFICE 2,278,466

QUICKLY DISINTEGRATABLE BONDED FOOD UNIT AND METHOD OF MAKING IT

Albert Musher, New York, N. Y., assignor to Musher Corporation, New York, N. Y., a corporation of New Jersey Application April 28, 1939, Serial No. 270,516

11 Claims. (Cl. 99—1)

The present invention relates to foods and to food processes, and it particularly relates to concentrated soups, and also to breakfast food combinations that are made into cake, brick or unit form by the use of binder materials so that these food units may be more readily stored, shipped, merchandised and utilized.

According to the usual methods for consumer preparation, it is customary for the consumer, in preparing soup, for instance, to purchase the ingredients as, for instance, mushrooms, vegetables, rice, or fish, meats, salt, sugar, pepper, and so forth in the form of separate packages or in cartons.

The consumer then prepares these foods for consumption, usually by cooking or boiling, etc. with other food materials or combinations of these food materials, so as to form the final cooked food. This involves considerable proportionment and labor by the consumer, and also the proportionment of the various ingredients requires that the consumer keep large quantities of various materials on hand so as to have them available for combination with the various foods when they are to be cooked preparatory to consumption.

It is among the objects of the present invention to provide foods, such as soups and breakfast foods, in an entirely new form with conveniences and utilizability hitherto impossible. By this invention, it is possible for the consumer to purchase in a single integrated unit form, a concentrated soup or a breakfast food containing all or substantially all of the various ingredients to be incorporated in the final prepared food, so that there will not be involved the usual substantial labor and difficulty of proportionment and so that there will be eliminated the necessity of storing quantities of the different materials that are to be included as ingredients in the final prepared food.

This new product also may be conveniently merchandised and stored in such prepared form, so as to provide various economies as for instance, enabling the packaging of three or four different soups, for instance, in the same single package, because of the dry cake formation of the soup unit.

A further object of this invention is to provide a food unit which will have quick disintegrating and dissolving features so that when the product is boiled or cooked or otherwise treated, it will dissolve quickly so as to eliminate or substantially reduce the tendency towards lumpiness, uneven cooking, and other substantial disadvantages which arise when quick dissolution and quick disintegrating is retarded or prevented.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In connection with that more detailed description, there is shown, diagrammatically, by way of illustration, in the accompanying drawings; in Figure 1, a section of one type of food brick or food unit made according to the present invention; in Figures 2 to 5, sections of alternative food unit constructions; in Figure 6, a section of food pieces, in which passages or channels have been developed, being locked and bound together by the binder; in Figures 7 and 8, sections of food unit constructions showing the channels and passageways between the food pieces; in Figure 9, a section of a food unit in which the food pieces are bound together by a sugar syrup-in-fat emulsion; in Figures 10 through 13, and in Figures 16 and 17, various forms of food units, Figures 10 through 12 and Figures 16 and 17 being perspective views and Figure 13 being a transverse section; in Figures 14 and 15, and in Figure 18, cross sections of food unit forms in which, part or all of the food pieces of the unit may be held in the molded or enclosed containers, which themselves are of edible nature; and in Figures 19 and 20, perspective views of packages containing food units to indicate the character of combination packaging.

In accomplishing the above objects, the breakfast food mix, containing food materials such as oatmeal, farina, salt, powdered milk, etc., or the soup mix containing materials such as dried carrots, dried peas, powdered tomato, tapioca, etc., is formed into the food unit of a quickly disintegratable nature by the use of a water repellent material, particularly where hygroscopic or gummy or paste-producing or powdery materials are present, together with a sugar material.

In order to provide for the quicker disintegration of the food unit, it is especially desirable to treat the food materials, particularly those that have a tendency to cake or gum etc., or that are of a hygroscopic or powdery nature, by coating them with a water repellent material, as for instance a hard fat, which is preferably utilized in this embodiment in a melted form, unless it is sufficiently plastic in its natural form. By coating these food materials with a water repellent substance, it is possible to keep these hygroscopic materials from being affected by the aqueous nature of the sugar syrup that is utilized in the further preparation of these food units, because the physical or chemical nature of these hygroscopic or water-reacting materials is changed, either immediately or upon standing, by their contact with the sugar syrup. Upon such contact, there is thereby produced gumming, caking, the formation of gritty substances, etc., which formation retards or eliminates the desired and necessary quick disintegration.

After the food materials are treated when necessary with the water repellent material, they are mixed with the sugar syrup of a quick dissolving or quickly disintegratable type which will act to bind these food materials or pieces together into a substantially solid food brick or food unit, which, when boiled, or cooked, or similarly treated, will readily dissolve and disintegrate so as to form the finished cooked product.

*Example I*

In the making of an oatmeal-mushroom soup there is used for example, 110 grams of powdered milk, 125 grams of hydrogenated cottonseed oil of 115° to 120° melting point, 220 grams of oatmeal, 60 grams of salt, 130 grams of glucose of about 39° Baumé, and 20 grams of dried mushrooms cut into small pieces. The hard fat is melted at a temperature of around 150° F. and is then mixed with a powdered milk, after which the fat is allowed to congeal and the milk-fat material is then broken up into small pieces or pulverized so as to permit uniform distribution throughout the mass.

Preferably, if desired, and if there is a sufficient amount of fat present to produce water repellent conditions, the powdered milk which is a very hygroscopic material, and which will cake very easily upon contact with aqueous substances, such as sugar syrup, may be mixed with the oatmeal and mushrooms, or may be mixed just with the mushrooms, prior to the addition of the fat. This procedure will usually result in a better dispersion of the powdered milk throughout the soup brick.

After the fat has congealed on the food, all of these dry materials are mixed together, unless they have already been mixed with the fat, and then all of these are mixed together with the glucose syrup so as to get adhesive surfaces. Then, this material may be molded or compacted into whatever shape is desired, and also into whatever predetermined weight and quantity that is required so as to provide a soup brick that will produce one, two, or three, etc., bowls of soup upon being cooked with water.

At times, under various conditions, it is desirable to utilize a fat material in conjunction with the sugar binder, not only as above described, but also in other ways such as for example by emulsification of the fat and sugar, and by other methods hereinafter described. This fat may be, depending upon its use, of a nature that is fluid at room temperature, but it is preferable, and in fact, it is generally necessary, that it should be of a nature which is hard or plastic at room temperature.

The use of a fat material in conjunction with sugar binders in many cases aid in the adhesion and binding quality, and further aid in the formation of the brick so as to give it new qualities of smoothness and also so as to enable better keeping qualities and food values.

Where a fat is used in conjunction with a sugar binder, it is at times possible or advisable to reduce the amount of sugar that is used for these binding purposes.

In those cases where the fat is of a plastic nature or of a rather soft nature, it is advisable to first harden it by chilling or by other methods, after it has been coated on the food pieces, or after it has been mixed with the hygroscopic or powdery materials. It is preferable, while it is in this hardened condition, to proceed with the mixing with the sugar syrup so that there will be less tendency for the syrup to mix with, and probably remove the fat from the food pieces while it is in its soft condition, because this would thereby substantially lessen or eliminate the protective element of the fat in conjunction with the food pieces that it is protecting.

In those cases where sugar and fat are utilized together, the various processes and methods that are used and the types of fats and other products that are used, are important considerations in accomplishing these results. For example, the sugar should generally be in a syrup form. An emulsion may thereby be made by thoroughly emulsifying a non-crystallizable sugar, such as invert sugar, with a hardened fat such as hydrogenated cottonseed oil of approximately 100° melting point or with a different type of fat, such as a palm kernel stearin of approximately 115° melting point, so as to result in the formation of a water-in-fat emulsion.

*Example II*

One emulsion that might be used consists of 320 grams of 39° Baumé glucose and 160 grams of 110° melting point hard fat. The glucose is heated to a temperature of 140° F. and the hard fat is melted at a temperature of 200° F. Both of these materials at this temperature are placed together and are whipped fast and thoroughly until the fat hardens and congeals, and encases the glucose. Preferably a chill bath should be employed while the product is being beaten, to facilitate congelation.

The glucose may be used, for example, in an amount around 300 grams and the hard fat in an amount around 60 grams, or these figures may range between the figures given, or other preferred figures may be used. Also, the temperature and other conditions may be further adjusted as required.

This emulsion may then be used as the binding material by mixing it with the food materials to be bound together. If the fat-sugar combination is not sufficiently soft for mixing, it may be warmed to the point that it is sufficiently soft to enable proper mixing, but care should be taken that in the warming or heating of this emulsion that the emulsion is not allowed to break or separate.

In this case the fat acts as the medium that directly contacts the food piece so that the glucose itself does not come into contact with it, but the glucose acts as a cushion so as to enable the compression or molding together of the food pieces into a food unit without the food pieces being pressed against each other so as to retard disintegration, or so as to destroy or change the unity of the individual food pieces.

With reference to the formation of a water-in-fat emulsion as above described, as well as with the utilization of sugar and fat in accord with this invention, there is generally the advantage that the binding action may be produced with a much smaller amount of fat than would ordinarily be required if fat alone were used as a binder. This is of considerable advantage in many ways, as for instance, in economy of cost, less fatty taste, etc.

Also a very unusual result in the procedure of utilizing water repellent materials, such as fats, is that the contact of the aqueous sugar syrup directly with the food elements is substantially reduced or entirely eliminated, so that particularly when hygroscopic materials are used, the aqueous nature of the sugar syrup does not interfere with the hygroscopic materials so as to cause lumping, hardening, caking, etc.

Also, as described herein, the utilization of fat with sugars may take the form of coating hygroscopic materials or other materials with a molten hard fat, allowing this hard fat to congeal on the food pieces, and then using the sugar syrup such as for example, glucose or invert sugar, as the binding agent. In this case, without further processing, the fat is not actually the binder but it is really the coating material which coats and protects the hygroscopic materials from contact with the aqueous nature of the sugar syrup.

In order to substantially reinforce the rigidity and hardness and to improve the general characteristics of the brick or food unit, it may be placed in a warm atmosphere or a warm temperature, above the melting point of the fat, after the food particles have been coated with a molten hard fat and then bound together by the sugar syrup, so that a portion of the fat which is coating the food particles will melt or soften. After this treatment, the fat is then allowed to congeal either at room temperature or by chilling. This heating treatment produces what may be termed a "vulcanization" procedure.

In this procedure, apparently under the conditions of a higher temperature, a portion of the fat surrounding relatively each particle, or food piece, or various particles, melts or softens, and this portion of melted fat combines with a portion of the melted fat of the other food particles or food pieces so that when this is congealed together, there is a very substantial and unusual strengthening of the entire food brick so as to form an entirely new very solid and durable structure.

In this heating or baking procedure, the following method is given by way of example, although other methods may be used as required. The food pieces or food materials are first coated with the hardened fat or other water repellent materials and then this coating is allowed to congeal. These coated food materials are then preferably broken away from each other, if this is necessary, by pulverizing or by breaking or mashing the food pieces apart, as required, and these coated pieces are then mixed with the sugar syrup.

The food unit is then compressed or molded together as required and is then allowed to dry, to more or less of a degree, as required, and to an extent depending upon the moisture that is present, or until the brick becomes somewhat harder. This may be done by a blast of cool air or by other methods so that the hard fat that is used, will not be melted at this point by the use of any heat treatment for drying, etc. Then the food unit may be placed in a temperature above the melting point of the fat, and preferably, in most cases, just above the melting point of the fat, for a period of time which may range from 10 minutes to an hour, or longer or shorter time may be employed, depending upon the temperatures involved and other conditions, after which the food unit should be removed and allowed to congeal at room temperature, but usually quick chilling may be preferred.

The character of certain fats, or other considerations, may be such that it will be found preferable to heat the food units not at a temperature just above the melting point of the fat, but at temperatures considerably higher than the melting point of the fat, but for shorter periods of time. In other words, for example where a usual procedure in accord with this invention might be to keep a food unit made with the 110° melting point fat at a temperature of 130° or 135° F. for 20 minutes, it may be found advisable, instead, to keep the food unit at a temperature of 165° or 175° or even higher if required for periods of time that may range from 1 minute to 10 or 15 minutes. Likewise, in some cases it may be found advisable to treat this food unit made with the specific 110° melting point fat at a temperature of 112° F. to 118° or 120° F. for periods ranging, for example, from one-half hour to two hours.

Care should be taken, however, that the degree of heat or the length of time involved is not sufficient to melt away all or substantially all of the fat protection from around the food pieces, or from the powdery or hygroscopic materials, because obviously, if this is done, there is a tendency towards the co-action between the food pieces or hygroscopic or powdery materials with any aqueous glucose syrup that may be present, and also the food pieces are then less protected against the air and atmospheric moisture, and still further the fat will have a tendency, under these conditions, to seep to the bottom of the brick so as to result in an un-uniform distribution of the fat within the brick with resultant weakness and lessened durability in some portions of the brick. In fact, in the regular baking-heat treatment, in order to maintain as much uniformity of the fat as possible throughout the food unit, it is advisable, where possible, to turn the brick over on its different sides during this heat treatment, and also, where necessary, to follow the same procedure during the early stages of the congealing treatment which takes place afterwards.

Instead of first drying the food unit before placing it into a warmer temperature in accord with this heat treatment, the drying may be entirely eliminated and the food unit may be placed in the warmer temperature for the fat to melt, as described, without any drying procedure being necessary.

*Example III*

An oatmeal breakfast food brick may be made with 240 grams of oatmeal flakes, 50 grams of powdered skimmed milk, 80 grams of 110° melting point hard fat, 110 grams of glucose of 38° Baumé and 15 grams of salt.

The fat is melted and brought to a temperature of about 210°, and at this temperature there is added to it the combination of the oatmeal and the powdered milk which have already been well mixed together. This dry combination is mixed with the molten hard fat so that there is a surface coating of the fat over the oatmeal and the powdered milk, and so that the powdered milk adheres as much as possible to the oatmeal flakes. This is then allowed to congeal at room temperature but preferably at lower cooler temperatures of about 40° to 50° F.

The salt may be mixed with the powdered milk and oatmeal before they are mixed with the molten fat, or the salt may be mixed with the glucose so as to enable better preservative action on the glucose with reference to fermentation, mold growth, etc.

After the fat has congealed on the oatmal-milk combination, the product may be broken down, if required, so that as much of the flake structure as possible is present in more or less individual flake form. However, in breaking down this material it is better to crumble it carefully, but particularly to be careful that hard mashing is not applied, because this will have a tendency to result in pressing the fat away from the powdered milk to more or less of a degree, and thereby permit more of a contact of this hygroscopic milk powder with the glucose when this is mixed in.

In order to facilitate the separation of the product into a flaky condition, the mixture of the fat-milk-oatmeal may be shaken or stirred as required while the cooling is taking place so as to keep the combination in more or less of a loose condition.

After the glucose-salt mixture has been mixed with the oatmeal-fat-milk, this combined material may be placed into molds or otherwise shaped, and it may then be compacted or compressed, as required. In compacting the material it is advisable to compact it as little as possible, so that the finished product will retain a durable structure, but nevertheless so as to maintain as much as possible of a structure that has a large number of passageways and openings running in and throughout the entire structure so as to permit easy ingress of water or milk or other liquid while it is being cooked.

These molded units are then dried by an air blast, or are allowed to dry at room temperature. However, with or without drying, they may be placed in an incubator or into a warm temperature at a temperature of 130° F. for 20 to 30 minutes, for example. They are then removed from the warm temperature and carefully handled because of their soft condition, and they are then allowed to congeal, but preferably, at this point they are placed into a chill box at a temperature of around 40° to 50° F., for example, so that they become hardened.

For variety other food ingredients such as raisins, nuts, chopped apricots or chopped prunes, etc. may be added at various points in the preparation of these bricks. In this particular example, the raisins, for instance would generally be mixed with oatmeal-milk-fat combination after it had congealed, and just before mixing with the glucose.

In many cases where it is inadvisable or impracticable or too expensive in production procedure to "vulcanize" or to heat-treat the food unit in accord with the method described, this treatment may take place by heating the sugar syrup that is used to the required temperature, as for instance between temperatures of 120° to 140°, depending upon the melting point of the fat and other conditions, or in some cases it may be advisable to heat the syrup to higher temperatures as for instance temperatures between 140° and 180° F. or higher.

If the syrup is then mixed with the food pieces at this temperature, after these food pieces have been properly coated with the fat material, this heat treatment is effected, particularly if the food units are permitted to remain at a temperature higher than the melting point of the fat for the necessary period of time.

In many cases this method is preferred over the baking heat treatment since there is a much quicker and a more uniform heat reaction throughout the entire food and since the hot syrup contacts the fat surfaces much more uniformly as it is mixed therein. However, care should be taken, when this method is used, not to have the hot syrup melt the fat, and substantially mix itself therewith, because the preferred result to be obtained is to have the melted or softened fat link and fasten itself together, particularly at various contact points.

A still further method of heat treatment that offers many other advantages is the use of electrical induction or various heat producing processes but, particularly for electrical induction, this may only be done in the presence of sufficient salt and water, for instance, to provide a suitable conductor.

The food unit, for example, may be made in the regular way by coating the food pieces with fat, allowing the fat to congeal, and then mixing with a conductive syrup, and then setting up an electrical induction. This electrical induction then sets up heat within the aqueous syrup so that a uniform heat is produced at various contact points with the fat, and thereby the fat is melted as required in order to complete the heat treatment described herein.

The advantages of the heat treatments described herein are that a very much stronger brick is produced, the edges and sides of the brick are considerably smoothened, and any ragged or crumbly nature of the bricks is considerably improved.

Also, whereas it is usually desirable to finish the bricks or food units by dipping them into molten hard fat in order to give them a smooth surface or smooth edges, the necessity for this is generally eliminated when these heat treatments are used. By eliminating these extra fat coatings it is impossible to reduce the fat in the brick, which may be advantageous both from the viewpoint of economy and edibility.

By this heat baking treatment as described herein, the food materials are bound together by a double structure consisting of fat, and also of a sugar syrup or similar sugar material. The fat structure in the food unit of this invention does not act as a solid binding material for the food materials, so as to result in an excess of fatty taste, generally slower disintegration, etc., but it takes the form of threads, films, and connecting pieces, so as thereby to give more of a skeleton formation, or a reinforced structure, whereas, at the same time, permitting the sugar binding material to form and afford its own additional structure and strength to the food unit formation, by the crystallization of the sugar within the food unit and by the other sugar strengthening bonds.

It is at times possible to dip the food pieces into a normally liquid salad oil, in order to obtain better disintegrating characteristics, particularly by avoiding excessive sticking together of the food particles.

In applying the hard fat to the food pieces, these food pieces or food materials may be treated not only by dipping them into the molten fat, but if required, the fat may be brought up to considerably high temperatures before applying it, or the food materials may actually be boiled in the fat for required periods of time and at required temperatures, so that they get a thorough soaking or a precooking or other treatment and so as to particularly produce a stable or firm greasy surface or substantially a water repellent surface which will not permit the food pieces to come into contact with the sugar syrup or other aqueous material and thereby so as not to result in lumping or reduced disintegration or similar disadvantages.

The coating of the food pieces or food particles with a water repellent material such as oils or fats, or with usually less preferred products such as waxes, paraffin, mineral oil, resins, etc., is of particular importance and practically essential in those cases where the food unit contains hygroscopic materials such as powdered skim milk, gums, gelatin, pectin, powdered or dried beef extract, or other hygroscopic or water absorbable materials, and also where there is present, at the same time, in the food brick, an aqueous material which would in some way affect, either physically or chemically, the nature of these hygroscopic materials.

Because of the coating of these hygroscopic food pieces with a water repellent material under conditions of this kind so as substantially to protect these food materials from contact with the aqueous material, there results substantially quicker disintegration and quicker cookability of the product as well as a considerable improvement in the finished food unit itself.

Although the amount of fat or water repellent materials used, may be of whatever quantity is desired so as to produce more or less stronger, rigid, or protected surfaces, the quantity that is used should preferably be no less than what is required to coat the food materials or the hygroscopic materials, even if there is to be only a very thin film or layer present. For general purposes, however, the amount of fat used for this coating or protective purpose ranges, for example, between about 10% and 50% based upon the quantity of food or hygroscopic materials to be protected. Of course, the quantity of fat that is used, will also depend upon the size of the food pieces to be protected, because obviously, more surface area requires higher fat percentages, and smaller surface areas require lower fat percentages.

In the embodiment of this invention, although any fats or oils may be used, the preferred fats usually are of the nature of vegetable stearin or they preferably may be classed as relatively rigid and relatively non-greasy at normal atmospheric or room temperatures. The fat, for most purposes, should preferably have an abrupt melting point so that when placed in boiling water, the brick will immediately break down and permit quick disintegration, so as to permit quick dispersion of the food materials in the water to form the final food preparation.

Some of the oils or fats that may be utilized in liquid form, or in partly, or fully hydrogenated form are oleo stearin, peanut oil, sesame oil, cottonseed oil, cocoanut oil, soya bean oil, rapeseed oil, sunflower seed oil, cocoanut stearin, palm kernel stearin, olive oil, etc. These oils or fats may be utilized by themselves, in various combinations, with each other or with others, or in combination with waxes, edible resins, and similar materials that may also be employed to give or aid in developing the desired water-repellent quality or the quick and abrupt melting point or other desired characteristics. Although any desired melting point may be used, a usually desirable melting point range is from 85° F. to 140° F., although for general purposes, the range usually may vary, for example, from about 95° up to about 125° F.

The melting points of the fats that are used in the formation of these food units may be regulated to meet the desired requirements. In other words, the melting point of the fat used for coating the bricks may be of a lower or higher melting point than the fat that is used to surround the food pieces within the brick. Also, the fat strips described hereinafter, or the fat coating containing the hygroscopic materials may be of a melting point that will melt either before or after the fat within the brick is melted or before or after the brick itself has disintegrated.

Although sugar materials are generally used in conjunction with fats and similar water repellent materials, as described herein, sugar materials alone may also be used. Particularly is this possible in those cases where a water repellent material, as herein described, is not necessary to permit quick disintegrating and quick cooking characteristics.

Whether used alone, or in conjunction with fat or other water repellent materials, the preferable sugar binders are those of a non-crystallizable or substantially non-crystallizable nature, as, for instance, invert sugar, honey, levulose, and glucose or corn syrup where required, etc.; or those sugars which are crystallized properly so as to dissolve quickly, or those which are combined with other materials such as glycerine, etc.; in order to have water-retaining or non-crystallizable qualities, and also those other types of sugar materials and sugar syrups which have similar quick dissolving and quick disintegrating qualities whether in dried or liquid form.

Examples of types of sugar other than those mentioned which may be used under various conditions either by themselves or in combination with other sugars are, for instance, cane sugar, lactose, beet sugar, maltose, molasses, maple sugar, etc. It is generally desirable to use sugars of reduced sweetening strength where binding action is desired with little sweetness to be added to the product.

At times, various dextrines may be used particularly in small amounts, in order to enhance adhesive quality where this is necessary. Where these dextrines are used they should be particularly of a very high soluble type. These dextrines usually are mixed in well with the sugar syrup but also they may be used where required, as a film, and particularly as a thin film, for coating purposes, in which case they may be used either alone or in conjunction with fat or similar water repellent materials.

Water or other aqueous materials should be added where required in order to cause the cohesion and adhesion between the sugar and the food pieces, which food pieces may or may not have been coated with a water repellent material, and all of this should then be stirred or mixed together and subsequently formed or molded into a cake, or brick or other suitable unit.

It is preferable in the embodiment of this invention, where crystallizable sugars are utilized, not to use the type of sugar that is a wholly crystallized sugar with practically no pores such as so-called rock candy, but rather to use the type of sugar that is composed of a number of small individual crystals which when placed together have channels running throughout them so that the water is not only absorbed by each of the grains which then dissolve as the water comes in contact with them, but so that there is a tendency for parts of the sugar which are outside of the contact with the water medium to actually draw the water to them very quickly. Also quite preferred in this use is sugar that has been made so as to be composed of porous crystals. These usually have high water absorption power and quick disintegration quality.

In the use of sugar in accord with this invention, where it is desired to retain or develop the non-crystallizable nature of the sugar for a longer time or to a larger degree, other materials such as glycerine or invert sugar, etc., may be added so as to prevent or retard the crystallization of the sugar.

Also where non-crystallizable sugars are preferred, various crystallizable sugars may be mixed with these non-crystallizable sugars where required, but wherever possible the usual procedure is to add as small a quantity of crystallizable sugar as possible, so as to substantially not change the non-crystallizable characteristics of the product, where this property is desired.

In many cases where it is desired to have a hard crystallized brick or food unit but where it is desired that the major part of the product should be of a non-crystallized sugar, a non-crystallizable sugar may be used in accord with the embodiment of this invention and then, after the food unit has been completed, it may be dipped or coated or otherwise treated with a crystallized sugar or a sugar which will be permitted to crystallize after it is placed on the surface of the food unit. In this way a much more durable food unit will be produced.

Although crystallizable and non-crystallizable sugars may be used, as set forth herein, as quickly disintegrating binding materials for food unit formations, nevertheless these types of sugar act differently in producing these results. The non-crystallizable sugars produce these results particularly because they do not result in a hard, vitreous, slow-water-dissolvable product, but to the contrary they result in a quality that enables the sugar to be very quickly dissolved in water, which is also particularly due to its high water-retaining and water-absorbing properties, together with the fact that it contains relatively higher amounts of moisture within its structure so as to enable this quick solubility.

Crystallizable sugars, on the other hand, accomplish this quick disintegrating procedure by forming hard crystals, which when prepared into the preferred embodiment of this invention, are of the characteristic whereby they are in the form of very small or substantially small crystals which have many pores, passageways and channels in and around them and throughout their entire structure so as to thereby enable the water to very quickly come into contact with a very large area of the sugar surface at one time and thereby to enable quick solubility and disintegration.

It has been found that generally the monosaccharides are much more adaptable for use in the embodiment of this invention, but as described herein any type of sugar either by itself or in combination with other sugars may be used with more or less advantage depending upon the type of sugar, and the characteristics of the other products or of the various processes involved. In general, however, it should be said that every effort should be made not to use a sugar which will result in more or less of a hard, vitrified condition, but to the contrary the sugar material or syrup that is used for this invention should preferably be a sugar that results in a series of small crystals or that remains in a non-crystallizable condition.

Also, preferably, and generally of material advantage, there should be retained some moisture in the syrup or sugar structure, as for instance about 2% to 8% or possibly within a range of about 10% to 25% or more, so as to produce a much more quickly-disintegrating and thereby a much more quickly-cookable product.

Although these foods which are bound together by the sugar material may be in their natural raw condition, they preferably are precooked, or prefrozen, or exploded by single or multiple explosion or processed by combinations thereof, or by other precooking or pre-preparing methods so as to render them quickly cookable in the final food unit form. These processes may result in, or the food may be prepared in absorbent or porous condition so that the sugar material, preferably in dissolved or liquid form, or the fat or water repellent material, will penetrate into the pores thereof so as to form a coating, or an impregnation, therein, or so as to form both a coating and an impregnation.

Although powdered or dry sugar may be used with necessary moisture, or thinner syrups may be utilized, it is in many cases very desirable to utilize sugar syrups or solutions of a relatively heavy nature, containing, for example, over 80% or 90% of sugar, although the syrup may be of whatever concentration that is desired or required for the specific purpose.

The concentration of sugar that is preferred naturally depends upon the type of sugar that is used, the nature of the food materials to be bound together, and other characteristics. However, for general purposes the water content of the sugar syrup may range, for example, from 5% to 40%, although generally for many applications the water content of the sugar syrup ranges, for example, between about 10% and 25%.

Although the sugar material may be interspersed in various ways with the food ingredients, it is usually sufficient to mix the sugar with the food so as to assure a thorough coating and then the product may be formed or molded as required.

It is usually desirable to compress or mold the food unit under a relatively slight pressure so that disintegration of the cakes, units, or bricks will be facilitated when they are placed in hot or boiling water preparatory to being cooked. The presence of flaky or springy food pieces is of further advantage in producing a more quickly disintegrating product.

In those cases in which it is desired to reduce the sugar content in the food unit, or where, because of the nature of the sugar, it is desired to have less sugar present in order to permit quicker disintegration, a procedure that may be used is, instead of mixing all of the food material with the sugar syrup, only one-half, or three-quarters, or a part of the entire combination of food pieces, or only one or two of the ingredients of the entire food combination may be mixed with the sugar syrup, and then this portion which is mixed with the syrup may then be mixed with the food ingredients which have not been mixed with the syrup. The result will be a food unit which will not have the same durability and structure as a food unit where all of the food material has been mixed with the sugar syrup, but nevertheless there may be sufficient present in order to produce the substantially solid food unit structure that is required, and at the same time so as to result in a lower amount of sugar being used or other characteristics that are desired.

The proportions of sugar syrup in the food unit may be widely varied although it has been found generally desirable to have an amount of sugar syrup which will range for example, from about 5% to 40% of the weight of the total unit. In many cases, however, depending upon the food used and the type and concentration of the sugar syrup, the desirable range of syrup used has been found to be between about 15% and 30%. In the preferred embodiment of this invention, where it is desired to obtain a cooked product having a minimum amount of sugar, the sugar in the binding medium, calculated as dry sugar, is usually present in quantities substantially less than the other combined food elements of the unit.

After the cakes, bricks, or other units have been formed, they may be dried to a reduced moisture content in order to enable more rigid or firmer units. This drying may take place under vacuum or in a warm temperature, or by air blasts, etc., or by combinations thereof. It is usually desirable that the moisture content of the final cakes or bricks be reduced to a rather lower moisture content, to the extent that there will be a lesser tendency towards deterioration.

The water content of the sugar syrup which may be used for binding the food unit is usually reduced to below 25% and many times below 10 to 12%. There is nevertheless no basic figure that can be adhered to because this will depend entirely upon the characteristics of the sugar syrup and the product itself. Where there is a high moisture content present, it will be found that the food unit can be hardened by some evaporation, and also the tendency toward fermentation of the sugar syrup is substantially retarded or eliminated when the required amount of moisture is evaporated.

Where there is sufficient water present so as to give a slight tendency towards fermentation or mold growth, preservative materials of a chemical nature or those of a food nature such as additional quantities of sugar or salt may be added. Also, acid materials such as edible food acids of the nature of citric acid, and so forth, may also be added if desired. Lactic acid, acetic acid or vinegar, etc., may also be included for preservative purposes if desired.

Where it is desired to remove any excess liquid from the food unit, after the forming or molding of the cake, brick or other unit, this may be done by the use of a vacuum evaporation procedure, by air drying or other drying procedure, so as to remove from the sugar syrup whatever amount of excess moisture it is required to remove.

Also the food materials in the brick or unit usually are desirably of a non-aqueous and substantially dry condition, especially as relates to free water as opposed to bound water, and for best results of flavor retention, and quick cookability they should retain, to whatever extent possible, some moisture, as for instance, over 2% or 3%, or probably over 8% or 9%.

Whereas various kinds, types and varieties of sugars may be utilized, sugars of a very absorbent or very readily dissolvable nature are preferred, as for instance, sugars or combinations of sugars with other materials which do not harden into a hard, non-granular, or relatively non-water permeable or non-water penetratable product.

Quick solubility and quick disintegration is one of the prime features for the preferred sugars for the usual embodiments of this invention.

*Example IV*

As an example of a food unit where fat is not used, a vegetable soup may be made with 160 grams of dried carrots, 75 grams of dried celery, 100 grams of whole green peas, 40 grams of salt, one-half gram of sage and 125 grams of invert sugar.

The dry materials are mixed together well and this is then mixed with the invert sugar. The product is then placed into molds and compressed quite tightly in this case in view of the flaky and springy nature of the materials that are used.

If desired these food units may be retained under some pressure until they have become relatively dry so as to retain their form. Instead of being made into single unit form they may be made into sheet form and then cut into units as required.

In conjunction with, particularly the fats or oils that are used, it is possible to include various types of medicinal and vitamin oils in quantities to give the food product desired therapeutic properties.

In drying the bricks, cakes, or other units, or in other ways treating them, particularly where heat is employed and particularly where there is present water-absorbable, or starchy materials such as cereals or farinaceous materials, for instance, it is desirable that the temperatures do not exceed the gelatinization point of the cereal materials or of the other similar materials that are present. For example, if certain starch materials are included in the brick, and if a drying temperature is substantially below 180° F., the brick will be of a nature, when treated in accord with this invention, which will most readily disintegrate in water, whereas if the temperature substantially exceeds this, with water or aqueous materials being present, there is a marked tendency for gelatinization so as to cause caking and less ready disintegration upon boiling in water.

The binder combination whether it be a sugar material alone or if utilized with fats, etc., must be of such nature so as quickly to dissolve or melt and release immediately the bound food materials, preferably before such materials have any tendency to become gummy or gelatinized or caked.

In many cases it is desired to form a brick or cake which comprises food pieces of say, for example, dimensions of ¼ inch or ½ inch square, etc., together with which there may also be powdery materials of a hygroscopic nature such as for instance, powdered milk, powdered orange juice, powdered lemon juice, etc. This aids in quick disintegration.

In cases such as this it might be desirable not to use a sufficient amount of fat or water repellent material to coat the larger food pieces, but it may be desired to protect and coat only the hygroscopic or powdery materials so as to prevent their contact with the aqueous elements that are present. Therefore, in these cases, instead of first mixing together the larger pieces with the powdery materials and then coating or treating all of these together with the fat, the powdery materials may be mixed with the required amount of molten hard fat and then, either before, but preferably, after congealing, this combination may be mixed with the larger food pieces.

It is, of course, desirable to congeal the molten hard fat together with the hygroscopic materials before having them come into contact with aqueous materials in which event there might be a tendency for the aqueous material to contact the hygroscopic particles if the molten fat is in liquid condition, and thereby cause lumping.

In other cases where it is desired to keep these powdered or hygroscopic materials from coming into contact with the sugar syrup or other aqueous elements present, these powdery materials may be mixed with the required amount of molten hard fat, and the resultant product congealed into flat strips which may be laminated on to the top or bottom or sides of the brick or food unit, or which may be laminated or otherwise affixed to the sides or bottom or top or center of the food unit, or which may be placed into a niche or crevice or groove made in the food unit for this purpose.

Preferably the food brick should have a rough surface where the fat strip is laminated on, so as to provide a firmer hold for the fat strip.

Also, if desired the food unit may be actually dipped or coated into the molten fat material containing the hygroscopic powdery material, and then allowed to congeal.

The combination of the hygroscopic materials in a fat or similar water repellent material, serves as an excellent dispersing agent for the hygroscopic materials, in that it not only protects them from the moisture present in the food unit itself or from the outside moisture conditions, but when the food unit is placed into water for final cooking, the fat melts evenly so as to permit an even distribution of the hygroscopic materials into the water and thereby prevents or retards the formation of lumps or hard pieces.

Where lamination of the combined fat and hygroscopic materials is required, this lamination can take place either by slight pressure or by melting the surface of the strip and applying, or by any other method.

Aside from using hard fat which has been mixed with hygroscopic powdery materials, plain hard fat either by itself or in combination with other oils and fats, or in combination with resins, waxes, etc. if required, may be used for coating the food units or as a medium into which the food units may be dipped so as to provide a harder and smoother surface. The dipping of the individual food ingredients or the entire food unit into molten hard fat or similar water repellent materials also helps to retain the moisture within the product so as not to permit excessive drying out of the product and thereby so as to enable improved quick-cookability, and particularly so as not to permit excessive drying out of the corners and edges and sides which might produce the formation of gritty or hard pieces.

These fatty materials whether used to coat the entire food unit or whether used to coat individual food pieces may contain antioxidants, food preservatives or other similar materials.

In many cases, when coating the food particles or the food units with the molten hard fat, it is desirable to bring this molten hard fat up to a high temperature as for example 220 to 240° F. and to apply it to the food products at this temperature. In these cases, this is advantageous in view of the fact that the fat will be thinner and therefore there will be a much smaller quantity of fat present, notwithstanding the fact that there will be sufficient to produce the protective quality or other characteristics desired.

Likewise with reference to the sugar syrup that is used, it may be desired in many cases to heat the sugar syrup to higher temperatures as for instance 150 to 170° F. so as to have the sugar syrup as thin as possible and thereby so as to have a reduced quantity of sugar present in the food unit notwithstanding the fact that desired binding action will be produced, although it may not be as great as when increased portions of sugar syrup are used.

For binding purposes, although sugars are preferably made into aqueous syrup form, nevertheless in some instances, the sugar, as for instance cane sugar, may be heated so as to melt the sugar and then this molten sugar mixed with the food pieces. However, this method is usually found to be considerably less preferable, and in fact it usually cannot be used at all in view of the fact that subsequent disintegration and solubility in hot water is rendered quite difficult.

However, in cases such as this, as well as in other cases, this solubility and disintegration may be facilitated by proper crystallization so as to produce quickly dissolvable and quickly disintegrating crystals as described herein, or by various methods such as by thoroughly emulsifying or mixing the molten sugar with a fat or oil, etc., or by mixing it with non-crystallizable sugar syrup such as honey, or invert sugar, or with glycerine, etc., to aid in producing relative non-crystallizing properties.

Of course powdered sugar or granulated sugar or similar dry sugar, may be used in some cases as a binding material by the addition of a small amount of water in order to develop its adhesive quality. The preferable way for using a dry sugar material such as this is to first mix the dry sugar with the food pieces to be bound together and then to add the small amount of water. In this way the powdered or granulated sugar is dispersed thoroughly before the water is added.

In the making of food bricks or food units which are bound together by various binding materials, the disintegrating quality of the food unit is substantially facilitated by the use of various effervescent materials which are mixed into the food unit. The effervescent materials such as, for example, the combination of sodium bicarbonate and tartaric acid are mixed into the food unit in dry form so that when the food unit is placed into water for cooking, these materials act together and form effervescent action which pushes apart the food pieces and food materials within the brick with considerably more rapidity than heretofore, and thereby there is produced a much quicker disintegration of the product so as to retard or prevent the development of lumpiness or caking or lack of proper cooking.

It is naturally not advisable to mix the effervescent material with the food ingredients so as to have it come into contact with the sugar syrup or other aqueous materials and thereby immediately produce effervescence, in view of the fact that when the food unit is then ready for boiling, there will be relatively no further effervescence.

In cases such as this, where there are aqueous materials present in the food brick, the effervescent materials, either mixed together, or singly, are first incorporated into a molten hard fat, or similar water repellent materials or combinations of various water repellent materials, and these water repellent materials are then preferably congealed so as to protect the effervescent materials.

This effervescent material and fat combination may then be ground or cut up and dispersed in the food materials which are to comprise the food brick, or this combination may be melted and applied to the food pieces or food materials in molten or plastic form and allowed to congeal thereon, and then the food pieces may be mixed with the sugar syrup in the regular way.

The melting point of the fat used for the effervescent materials may be adjusted in relation to the melting point of the fat that is used to surround the food pieces, so as to produce the maximum disintegrating effect. In other words, if it were desired, the hard fat containing the effervescent materials could have a melting point below the melting point of the fat which is used to surround the food pieces, so that, in cooking, the effervescent materials would be released before the fat protective would be melted away from the food pieces, and thereby there would be produced a result whereby the effervescent action would disintegrate the food unit while the food pieces still retain their protective coating in good part, and then this protective coating would be melted substantially after the food unit has become disintegrated. This would result in even less tendency towards lumping or caking.

In the utilization of the effervescent materials, it is usually preferred to have them mixed with, or attached to, food flakes or larger food pieces, rather than to have them used solely in conjunction with powdery food materials. This is because of the fact that, when the food unit is formed so as to include larger food pieces in conjunction with the effervescent materials, these larger food pieces form more of a resistance by way of an increased surface, so that as the gas from the effervescent material is generated, it can push against these buffer surfaces and thereby there is increased the tendency towards quick disintegration.

However, when powdery food materials alone are used in conjunction with the effervescent materials, there is a tendency for the gas created by the effervescent materials to bubble out from around the small powdery grains without producing the usual amount of disintegrating effect. This disintegrating property, however, is considerably enhanced, when the effervescent materials are actually attached to the powdery food materials, and also to the larger food pieces, by having them applied with molten hard fat or similar adhesive materials.

In the utilization of these effervescent materials it is usually preferable to use them in such proportion so that in the final product they will neutralize themselves and so that there will be no excess acid or alkali in the finished product. However, if it is desired, the proportions of these materials may be so regulated so that the final product will be alkaline if this is required or so that it will be acid if this is required.

*Example V*

As an example of the use of an effervescent material, 30 grams of a combined mixture of sodium bicarbonate and tartaric acid may be mixed with the oatmeal brick of Example III. This combined effervescent material may be mixed with all of the dry materials before the molten hard fat is added, or it may be mixed with the powdered milk and molten hard fat, or the sodium bicarbonate may be mixed with one portion of the molten hard fat and the flake-milk combination and the tartaric acid mixed with another portion of the powdered milk-oatmeal-fat combination, or various other methods may be used.

When the food unit is molded or compacted together, and then placed into water for boiling, it will be seen that a foaming is produced by the effervescence and it is this foaming and generation of gas within the food unit that very substantially aids in pushing the flakes apart and so as to provide substantially quicker disintegration of the food unit.

This food brick might be compacted together somewhat more than usual so as to provide increased resistance or buffer action against the effervescense.

In the matter of cereals or other starchy materials, where it is desired that the product should be hydrolyzed when the product is cooked, the effervescent materials may be regulated so that they will be slightly acid in the end product, or additional acid may be present in the unit, so that the final product will then become hydrolyzed upon cooking with water.

This feature is particularly important in view of the fact that one of the difficulties in the use of cereals as food products is based on the fact that they do not release their mineral elements such as phosphorus, and particularly calcium, in human nutrition. For this reason many cereals today carry such added medicinal or therapeutic features as added vitamin D or various added calcium compounds, etc.

However, it has been found that the mineral elements in cereals are released for human nutrition, when the cereals are hydrolyzed. Although this hydrolysis may be produced at the time that the product is first manufactured, there are some disadvantages to this procedure in that there are various elements of oxidation and other deteriorating effects that take place when these foods have been pre-hydrolyzed and allowed to remain in storage, etc., in this condition.

Under this new process however it is possible to mix acid materials in proper amount, and particularly to coat these cereals with acid materials by water repellent materials, so as to provide for a uniform distribution of this acid, and at the same time so as to protect the acid from coming into contact with moisture in order to keep it from becoming active until it is actually cooked in the water.

Thereupon when the cereal which includes the required amount of acid, is placed in the water, hydrolysis immediately takes place so that newly released mineral elements are produced in their new nascent condition in order to provide the maximum effectiveness of these minerals in human nutrition.

Also by this method, the pre-digestion that has taken place by virtue of this hydrolysis is very important for enabling better nutritional quality.

Further, the use of fat in conjunction with cereals, for instance, aids very materially in the utilization of the phosphorus and calcium elements, etc., therein.

Also in many cases it may be desired to have enzymes present so that as the enzymes come into contact with water, hydrolysis or other desired enzymic action may take place. In cases where water will affect enzyme action during transportation and storage, it is desirable here also to protect the enzyme materials by admixture with melted hard fat or plastic fat or similar water repellent materials.

In the embodiment of this invention, various types of enzymes such as proteolytic, lypolytic, or diastatic enzymes, etc., may be included and may be regulated by incorporation into the fat or by other processes, so that they will act upon the food product as required, and so as to render it more digestible and so as in other ways to modify the food characteristics.

Under certain conditions it is advisable and possible to add the effervescent materials directly to the brick without protection of any water repellent material, so as to cause an effervescence within the brick itself. The result of this is that an aeration takes place within the brick and these air bubbles may be sealed within the brick, after they have been generated, by either dipping the brick into a molten hard fat or by drying the brick rapidly, or by some other means. The result of this operation is that the brick becomes aerated, with the result that when it is placed into the water for cooking or for treatment, the brick floats on top of the water and does not sink to the bottom, in this way preventing or retarding the burning of the food unit on the bottom of the pot.

Also by aerating the food brick in this way, the particles within the brick are pushed farther apart from each other and thereby disintegration is substantially facilitated when the unit is cooked or boiled. The food unit may contain effervescent materials which have been permitted to effervesce by contact with moisture within the food brick for the purpose of aerating, and, at the same time, the food unit may also contain additional effervescent materials which have been protected by fat or other water repellent materials so that further effervescence takes place at the time of cooking, so as to enable quicker disintegration.

Another advantage of this effervescence procedure in the food unit is that, particularly where carbon dioxide or other inert gases are formed within the food unit, the oxygen to a large extent is displaced and therefore rancidity of the fat and similar oxidation is substantially reduced.

One of the advantages of placing the dry, unreleased effervescent materials within the food unit in a protected, water-repellent condition, is that the product may be packaged, merchandised and shipped in much smaller containers because of the fact that it is not expanded with gas, whereas as soon as the food unit is boiled, the gas develops within the food brick so as to cause the desired disintegration, but during transportation, etc., the food unit is in its smallest most compact size.

Also in order to further facilitate the floating of the brick in boiling water, the fat that is used in the brick may be whipped or beaten so as to aerate it. This gives some aeration although in view of the smaller amount of fat that is used it does not produce the advantages as obtained from effervescent materials.

If the effervescent materials are mixed with the aqueous sugar syrup for aeration purposes, care should be taken that this aqueous material is mixed very lightly so as to retain the maximum amount of gas within it. This aerated aqueous sugar medium may then be used as a binding material in accord with this invention.

Also, the effervescent materials may be mixed with the dry ingredients of the food unit and then the aqueous sugar syrup as above described, mixed with these dry materials in the regular way. Then, after the required amount of gas has been developed in these units, they may be immediately placed into molten hard fat and then, for example, placed immediately under conditions of quick chilling so that the hard fat will seal in the gas within the brick. Two or three coatings or dippings in the molten hard fat may be necessary, or plastic fat, etc., may be used.

It has been found desirable, in the preparation of the food units of this invention, wherever it is possible to do so, to mix with any gummy, gelatinizable, or starchy materials, whenever these are present, food pieces of relatively non-gelatinizable or non-starchy or non-hygroscopic quality. These non-gelatinizable pieces then act to separate the gelatinizable pieces and thereby there is substantially reduced the tendency towards lumping and sticking together. Likewise, this procedure applies when there is present powdery substances, in which case, it is desirable to retard or prevent lumping by having these powdery materials mixed with larger sized food pieces so as to aid in separation.

For example, in making a mixture where pasty-resulting materials, such as cornmeal, farina or powdered cornstarch, etc., are present it would be advisable to include dehydrated carrots or celery or other similar relatively non-pasty-resulting materials, in view of the fact that the dehydrated carrots and celery, being of a relatively non-gummy nature, would separate the gelatinizable materials so as to considerably minimize lumping in the final product, upon cooking or otherwise treating. However, as described herein, fat coatings, etc., may be used also to provide these results.

In those cases where it is desired to use no fat or a reduced amount of fat, but where it is desired to have the individual food pieces cook after they have first become disintegrated from each other, these food pieces may be coated with a hard, vitreous sugar coating and the binding agent may be of a non-crystallizable or quickly disintegrating sugar. In other words, several types or combinations of sugars, or differently processed sugars may be used so as to provide slower or faster dissolving features and thereby so as to release the food particles contained within the brick at different times in the cooking operation, and so as to provide for different cooking procedures.

In view of the fact that this invention relates to the use of sugar syrups as a binding agent for food materials, where quick dissolvability are required, every effort should be made to keep away from direct contact with the aqueous sugar syrup, substantially any hygroscopic materials or powdery materials such as gums, gelatins, cornstarch, powdered milk, powdered beef extract, etc., because when these materials come into contact with the aqueous nature of the sugar syrup they have a tendency to gum and cake, and in this way there is a very substantial difficulty that is caused and at times it is practically impossible to dissolve or at least to cause quick dissolving of these products when they are finally cooked in water, particularly without the formation of lumps, or hard, or uncooked pieces, etc.

In those cases where highly hygroscopic or gelatinizable materials are used they should preferably be used in smaller quantities but wherever they are used whether in small quantities or larger quantities they should preferably be given further treatment so as to keep them from coming into actual direct contact with the sugar syrup or other aqueous materials which may be present, as for instance they should be treated with molten hard fat or other water repellent materials as herein described.

In some cases it may be desirable to place the hygroscopic materials such as for instance powdered milk, gelatin, powdered lemon juice, dried egg albumen, etc. within a gelatin capsule or another type of quick soluble capsule and then to place this capsule within the food unit so that, during the cooking operation, this capsule will dissolve and release these hygroscopic materials which, however, will not have come into contact with the aqueous sugar materials and thereby will not result in the hardening of the sugar binding structure so as to make difficult the disintegrating procedure.

One possible method of food unit formation, although different from the embodiment of this invention, is to press or compact the food materials together with a small amount of molten hard fat, for instance, so as just to coat the food materials, although a higher amount of fat may be used if desired, and then, in view of the small amount of fat that is used, permit the product to remain in the press until it is in a hardened or bonded condition, which hardening may be done by cooling or chilling. Then while in this solid condition, coat the food unit with a sugar material so as to produce a more durable food unit.

In the formation of the bricks or molds or other forms that are produced in accord with this invention it is usually desirable not to compress too tightly the food materials with the sugar syrup, in view of the fact that a lighter pressure permits the water of the cooking procedure to more easily enter within the structure of the unit so as to permit quicker solubility and disintegration, and also the particles of food are kept farther apart when they are not compressed so tightly and this thereby permits less tendency towards lumping or caking upon disintegration.

Therefore, wherever possible, it is preferred to control the compression or compacting of the food units so as to result in this compacting being as light as possible but at the same time so as to obtain for the food unit the rigidity and durability that is required, and also so as to retain in the food unit, as many open pores, spaces, or channels as possible for the quick ingress of the aqueous materials of the cooking operation.

This procedure of retaining these open channels and openings is further facilitated by the use of large flake materials or large food pieces, particularly where they are of irregular or substantially irregular shape, or where they are compacted together in irregular placement. Under these conditions there is provided a resistance against compression, or a springiness, which permits greater compacting pressure where this procedure is followed, while still retaining openings for the easy ingress of water or other aqueous materials.

Lighter compression is usually much more advantageous particularly when small grained materials or powdery materials are used in view of the fact that when larger food pieces such as pieces of dehydrated carrots or dehydrated celery are used, a tighter compression or a very tight compression does not reduce the tendency toward quick disintegration to the same extent as occurs when powdery materials are tightly compressed.

In those cases where the food unit consists almost entirely of powdery or small grained pieces, or where it consists in a rather large part of this type of food material, it is usually advisable to dip, coat, or similarly treat these powdery or small grained pieces with molten hard fat and then to sift them one or more times during the cooling operation, or after they have become congealed. The advantage of this procedure is that, aside from coating these materials, the procedure of mixing them with fat and then sifting them, particularly where a not-too-fine sieve is used, results in these powdery materials being formed into larger sized hard pieces, and these may then be utilized without many of the disadvantages of the same food in its powdery condition. However, generally, in the compressing or compacting of these small pieces, it is usually desirable that they be compacted more lightly than larger food pieces so as to thereby enable quicker disintegration.

Also care must be taken when effervescent materials are coated with water repellent materials and are used in the food bricks, because if too tight a compression results there is a tendency for the aqueous sugar syrup to be pressed through the water repellent coating of the effervescent material and thereby destroy the effervescent quality of the effervescent material before the cooking procedure begins.

It is further preferable in the embodiment of this invention, to arrange the compacting so that each flake or food piece is bound to another food piece or another flake at various points, but preferably the full surfaces or substantially the full surfaces of each food piece should not be bound to substantially the full surfaces of other food pieces in view of the fact that this will again preclude or retard the free movement of the water or other aqueous materials around the food pieces or the penetration of the liquid to the fullest degree, which free movement is necessary during the cooking operation so as to quickly produce the disintegration of the food unit.

Therefore, preferably, wherever it is possible to do so, and providing there is produced a food unit of the desired durability depending upon the characteristics of the other materials, etc., that are used, the sugar binder material should coat the edges or only a portion of the surfaces of the flake materials or food pieces and it should bind these edges, etc., together, rather than bind together the entire full surfaces, which would have a tendency to slow down the penetration of the water or aqueous material.

In the utilization of this invention it is at times desirable to use a crude sugar or at least a sugar which is not fully refined, so that some of the resinous materials or other crude qualities remain, if these specific binder properties, etc., are required.

The food units of this invention, while the fat or other similar materials are in a molten or soft condition, may be whirled, or centrifuged, or similarly treated, so as to drive the liquid or softened materials to the exterior of the brick, and these then may be either removed from the unit formation, or left thereon to further strengthen it.

At times, it is also desirable to treat for mold prevention, or to sterilize, at least to some degree, the various foods, as for instance, meats and fish which have been at least partially dehydrated, by permitting them to remain in the sugar syrup at higher temperatures for various periods of time, under vacuum, or pressure, or atmospheric pressure, and then molding or briquetting the foods as required. Similar sterilizing action under similar conditions as set forth, may be accomplished, and usually preferably so with the hard fat or water repellent materials that are used.

In the binding together of various food materials such as vegetables, meats and fish, etc., it is at times desirable to boil or cook the vegetables, meats, or fish in the sugar syrup so as to enable penetration of the sugar into the structure and pores of the food piece.

Although in many cases it is desirable to use a relatively large amount of sugar syrup and sometimes it is preferable to use an excess of sugar syrup, and then dry out the moisture or permit it to stand, or otherwise treat it so that sufficient hardness and dryness occurs, nevertheless, generally, it is preferred to use a thinner film of sugar syrup, of a quickly disintegrating and quick dissolvable nature so as to obtain such quick disintegration of the food unit.

In applying the sugar syrup to the food pieces it is in a great many cases desirable to heat the syrup preliminary to mixing it with the food pieces, or while mixing, to higher temperatures as for instance 140° F. to 170° F. so as to get the syrup in thinner form and thereby enable a thinner coating of the syrup, in this way providing a quicker solubility and disintegration of the food piece. This heating method is particularly important in those cases where the syrup itself is of a normally heavy body and where it would not be desirable to produce a food unit in which the binding material is of a heavy structure, which, when dried, produces a heavy-walled interface.

This procedure of thinning the sugar material is usually desirable where there is used a very heavy glucose or other sugar syrup, although, of course, this is not a necessary routine, particularly if a heavier sugar interstructure is desired.

However, where fat is used as a protective for the food pieces it obviously is not always advisable to raise the temperature of the syrup to a temperature higher than the melting point of the fat except in those cases where it is desirable to produce a baking or so-called "vulcanizing" procedure as described herein.

It is preferable and quite important in the carrying out of this invention to so manipulate or process the sugar material, or sugar syrup that is being used so that in the final food unit, this sugar material will be in a very grainy, perforated, channelled, or quickly absorbent form depending upon the nature of the sugar used, and other considerations. This is important in that it is necessary to permit the water of the cooking to quickly pass through the sugar into all parts of the food unit as rapidly as possible so as to permit the liquid of cooking or other treatment to surround the sugar material and dissolve or disintegrate it as quickly as possible. Care should be taken wherever possible not to permit the sugar to result in unbroken, relatively hard-to-dissolve layers of sugar, and particularly such thick, hard, or vitreous unbroken layers of sugar so as to impede the disintegration of the food unit or the dissolving of the sugar.

In its generally preferred form, the products of this invention should result, wherever possible, in a food unit or food brick in which the sugar binding material does not act as an impregnated mass which fills all of the interstices and openings of the food unit because rather there should be a good number of openings and preferably a large number of openings, crevices, pores, channels, and such, in and around as many portions and pieces of the food materials as possible, as well as in and around the sugar binding structure itself. This enables the water or aqueous material of the cooking or disintegrating procedure to very rapidly enter into the formation of the food unit and produce disintegration.

In addition, if possible, the sugar binder structure should be composed of a non-crystallizable sugar or of a sugar that has been crystallized into small grains rather than into a solid crystallized unit.

In any drying procedure of the various food pieces, etc., that are used in the formation of these food units, it is usually desirable that when they are dried, that at least a small percentage of moisture remains, as for instance over 2% to 4%, or at least that the bound water remains so as to aid both in quick cookability as well as in retention of flavors.

The use of sugar syrups and particularly the use of non-crystallizable sugar syrups, with the use of glycerine or such products, where required, aid materially in the formation of a food brick in which are used food materials which lose their flavor, to more or less of an extent, by dehydration. For example, in the dehydration of tomatoes there is a large loss of the original tomato flavor which, it is now found, can be avoided or retarded by dehydrating the tomatoes to a point where the bound water is permitted to remain.

The accomplishment of this result if further effected by the mixing together of the tomatoes, or of the other similar food products, which have been dehydrated in this way, with the sugar syrup of the food brick, which in this case particularly should be a non-crystallizable or water-retaining sugar. Under these conditions, the bound water, and the consequent flavor of the food, which flavor is held by the bound water, is retained because of the moisture that remains substantially intact in the sugar syrup, and thereby aids in retaining the required moisture necessary for flavor retention, as well as for quicker-cooking properties.

Likewise, in place of the sugar, hereinabove mentioned, hard or plastic fats, or other water repellent materials, or combinations of these water repellent materials with the sugars, may be used, by dipping, coating, or mixing, etc., in conjunction with the food materials, in order to retain moisture within these foods after the dehydration has taken place to the required extent, as above described.

Similarly, where desired, tomatoes with a considerably higher moisture content, as for instance, tomato paste, may be mixed with noncrystallizable, or water-retaining sugar syrup to result in water retention for the tomato paste, although foods containing a relatively high moisture content can usually not be used in producing the rigidity or durability necessary for the food units of this invention.

The use of plastic fat, and particularly hard fat, or other similar water repellent materials is quite advantageous in the embodiment of this invention, not only as described herein, but also as a means of retarding the development of mold growth and other deterioration effects in and on the food pieces that it surrounds, because of the protective coating that it affords by itself, and particularly when this hard fat has been mixed with various protective materials, or when the food pieces have undergone various protective processes.

The food ingredients used in the formation of these food units should preferably be in a precooked or otherwise prepared or quickly cookable condition, so as to make the food unit a product capable of substantially more rapid preparation.

Example VI

A relatively more quickly cooking soup may be made, as, for example, the following beef broth, by using 170 grams of palm kernel stearin of 115° melting point, 50 grams of salt, 40 grams of onion powder, 60 grams of dehydrated beef extract, 50 grams of exploded carrot pieces, 100 grams of quick cooking oatmeal flakes, 35 grams of a dry powdered effervescent material and 135 grams of glucose of about 40° Baumé.

The onion powder, the dehydrated beef extract, the exploded quick cooking carrots, the quick cooking oatmeal flakes, and the effervescent material are mixed together thoroughly. The palm kernel stearin is then melted to a temperature of 220°, and at this temperature the mixed dry materials are added and mixed therein.

This combination is then congealed at 50° F. until the stearin has congealed quite hard around the food pieces. The material is then crumbled so as to break away the food pieces from each other, but so as not to pulverize or powder them.

These pieces are then mixed with the glucose which has previously been thoroughly mixed together with the salt. After this mixture has taken place, it is proportioned into predetermined quantities and compacted into molds.

These food units are then allowed to stand at a temperature of about 65° F. at a reasonably low humidity, with air circulation, for a period ranging from about 4 to 10 hours, or until the bricks are fairly durable, or rather dry. They are then placed in a warm temperature of 130° F. for 45 minutes, after which they are removed and immediately chilled at a temperature of 40° F.

These food units should be molded in predetermined quantities so that each unit may be used with a specified amount of water or other aqueous materials so as to produce a required amount of soup.

In this food unit various other quick cooking food materials may be used as for instance exploded celery, exploded meat pieces, or other quick cooking materials which may have been precooked by various methods. All of these materials however, should be adjusted in their quick cooking process so that they will all cook in relatively the same period of time so that some of the food pieces will not be in a relatively hard condition whereas other pieces have become overcooked.

Example VII

Likewise, a relatively quickly cookable pea soup brick may be made by mixing together 280 grams of exploded ground green peas, 20 grams of cornstarch, seasoning as required, and 50 grams of effervescent material. These combined dry materials are then mixed with 110 grams of hard fat of about 115° melting point at a temperature of 200° F., after which congelation is allowed to take place. This base is then mixed with 60 grams of 40° Baumé glucose which has previously been mixed with about 30 grams of salt.

The remaining procedure is along the lines as described herein except that it is preferable in this example to sift the dry mixture-fat combination several times during the cooling process, and before mixing with the glucose syrup so as to get particles of relatively larger size and also so as to get particles which are more individually coated with the fat.

In order, therefore, to provide readily cookable foods in these food units, these foods may be precooked by any of the methods or combinations of methods such as the following—explosion, cooking, freezing, electrical shock, thermal shock, and similar other methods so as to rupture the cells and form the cells into a broken, softened, or absorbent condition so they may be more readily prepared.

Also, particularly when some or all of the food elements in the food unit have been exploded, in which case they usually have interstices or crevices within them, these crevices will form a very good foundation for the binder material which will be able to seep into these interstices or crevices and thereby retain an anchorage, or a better hold on the pieces so as to form a more durable brick.

In the preparation for the food units of this invention, of various food products such as meats, fish, vegetables, and fruits, etc., so as to enable quick cooking, these materials, for example, are first dried to a moisture content below 35% and preferably below a moisture content of 15% or 20%, and they are then placed into a steam or pressure chamber, and the pressure raised, for example, to about 50 to 100 pounds per square inch and the heat to a temperature of 400° to 600° F., for instance. Then after 15 or 20 seconds, or after the required amount of time, the chamber is suddenly or instantaneously opened so as to immediately eject the food materials in an exploded condition. These materials may then be used either alone or in conjunction with other exploded or nonexploded or otherwise treated products to form quick cookable food units.

It is generally advisable, where explosion is used in order to provide quicker cookability, to control the explosion so that the food will not be over-exploded to the extent that it will disintegrate substantially into small pieces and thereby lose whatever desired unity is required either before, during or after the cooking procedure.

Food products such as vegetables, fish, meats and fruits, etc. may be given a precooking treatment by subjecting them to freezing temperatures, particularly by slow freeze methods, so as to disrupt and soften the cell structure. These food materials may then be dehydrated to the required point but preferably to a point where they still contain their bound water or even an excess of the water so as to retain their full flavor and their quick cooking advantages. If desired they may then be exploded as described herein.

Immediately after this treatment, or in fact after any of the pre-cooking or pre-treating processes for increasing quick-cooking quality, whether described herein or not, these food products may be placed into molten hard fat or into other water repellent materials which will retain at least to a large degree the moisture within the food particles and also which will aid in protecting them from weevils, infestation, moisture, oxidation, and other unfavorable conditions.

Also in order to produce quick cooking qualities, these various food materials may be subjected to ordinary cooking conditions, or may be cooked under pressure, or vacuum, etc., and then may be dried as above described, preferably so as to retain their bound water and other conditions of quicker cookability. Also they may then be exploded, if desired. Still further, if desired, these foods may be subjected to one or more combinations in various sequences of the freezing, cooking and drying procedures.

In the preparation of relatively high starch materials such as starchy beans, peas, potatoes, bananas, etc., for quick cooking properties, the use of freezing treatments and cooking treatments as herein described, with subsequent drying and explosion, is much more effective in producing this quick cooking quality than the use of explosion alone without these freezing or precooking treatments.

In any of the cooking operations herein described, whether under pressure or vacuum or normal atmospheric pressure, or whether in the explosion chamber, or elsewhere, there may be used electrical induction, or other forms of electrical discharges, or heat induction, or other methods to provide cell rupturing or cell softening or other quick cooking advantages.

In these processes for producing quick cookability, whether herein described or not, the final resultant product for incorporation into the food unit should preferably have, depending upon the degree of quick cookability required, some moisture remaining therein, as, for instance over 3% to 4%, or over 7% to 8%. These food materials, whether or not in a precooked condition may be dipped or coated with a plastic fat, or a molten hard fat which is then congealed not only to aid in sealing and retaining this moisture within the food, and to aid in keeping the food fibers in a softer condition, but also to keep the aqueous sugar syrup from coming into contact with the food piece and withdrawing any moisture therefrom, or drying or hardening the food surfaces. For best results, the food materials should be dipped or coated with the plastic fat, but preferably with the molten hard fat, immediately after the dehydrating of the food material.

In the preparation of food units as described herein, it is of substantial advantage to use exploded food materials, such as exploded carrots, celery, meats, fish, etc., not only because of their quick cookability but also because of the fact that they aid in producing a springiness in the compacting operation and also, because of their porous structure, they facilitate the ingress of aqueous materials not only around them but also within them, all of which aids materially in the disintegration and quick preparation of the food units.

It is usually not advisable in these food units to use the ordinarily fully puffed or fully exploded cereals which collapse when treated with water, and particularly hot water, into a mush or disintegrated mass, but it is desirable to use partially expanded cereals which will be rendered more quickly cookable but in which the starch grains will not have been fully exploded so that when the cereal is cooked there will be obtained cooked rice or cooked barley, etc., which will not be of a mushy disintegrated condition but which will retain a more appetizing and more acceptable form.

Vegetables, meats, fish, or other food pieces, which are to be included in the food units of this invention, may be more fully expanded or exploded under various conditions and in various ways, so as to produce the required results, depending upon their fiber structure, their starch content, and other considerations.

By the formation of food units or food bricks as herein described, there are many advantages which accrue as, for instance, the uniformity of the mixed product that is produced. For example, in ordinary dry food mixes, which are combinations of various food pieces with or without powdered materials, there is the tendency towards segregation during transportation and handling so that when the product is used it is impossible to obtain a complete uniformity when using a portion of the package, but it is necessary to use the entire package in order to obtain the correct proportions. Under this invention, however, in view of the fact that each food unit comprises a proper proportion of ingredients, all held and bound together, it is now possible to provide these food mixes in a fully stable and uniform combination so as to result in a uniformly proportioned product when it is cooked or prepared.

Also when dry mixes are put into water or other aqueous materials to be cooked, there is a tendency for them to lump or cake together in view of the fact that they all go into the fluid of the cooking utensil at about the same time. However, in this new form, there is a tendency for the various food pieces to fall away from the food unit in a uniform and even manner so that there is not the sudden breaking away of the food ingredients, so as to cause the formation of lumps and other similar disadvantages.

It is often desirable in connection with the bricks of the present application to prepare them so that they will float upon the hot or boiling water during preparation. In this manner the food particles will disintegrate, separate, and cook much more readily than if the entire brick is permitted to fall to the bottom of the pot or pan during the cooking operation.

To obtain this floating effect it is possible to cause air to be included in the brick or to provide sealed recesses in the interior of the brick which will contain some quantity of air. Where amounts of hard or plastic fat are employed in the brick, the fat may be whipped to retain some air. Also, soluble edible capsules containing air, or carbon dioxide, etc., may be included in the body of the brick.

Examples of various types of concentrated soups in unit form that may be made in accord with this invention are vegetable, pea, cream of barley, mushroom, cream of oatmeal, beef broth, chicken and rice, fish chowders, clam chowder, tomato, onion, cream of spinach, cream of celery, cream of asparagus, beet, corn, etc.

Examples of various types of breakfast foods in unit form that may be made in accord with this invention are oatmeal, farina, cornmeal, cereal combinations, wheat cereal, and breakfast foods made from peanuts, wheat germ, soya beans, etc., any of which breakfast foods may contain added food components as for instance, raisins, prunes, dried apricots, dried bananas, nuts, etc.

However, other food bricks, molds, or units that may be prepared in accord with this invention are prepared mixes for sauces, ice cream, baked, cooked, or other food combinations, such as ice cream mix, cake mix, pie filling mix, salad dressing mix, etc. These food units may further be utilized in the production of bricks, molds, or units comprising foods such as dehydrated foods, dehydrated carrots, dried fruits, dried vegetables, alimentary paste materials such as macaroni, spaghetti, and noodles, dried meats, dried fish, etc.

Although various feed products, and particularly breakfast foods and soups, comprise the preferred embodiments of this invention, products other than foods, such as pharmaceuticals, etc., may at times be utilized accordingly.

In the drawings there are shown diagrammatically the general formations of food units which may be prepared according to the present invention.

In Figure 1 the food pieces 11 are coated with the fat 12, which fat has included therein the particles of the hygroscopic or powdery materials, or effervescent materials etc. 13. These food pieces protected by the fat coating, are then held bound together by the sugar syrup 10 so that the food unit, when dried, crystallized, or congealed etc., will be in the form of a durable food unit.

If the food unit of Figure 1 is then baked or "vulcanized" as described herein, a formation, diagrammatically shown by Figure 2, will be obtained. In Figure 2 the food pieces 11 are protected by the fat coating 12 in which is dispersed the hygroscopic or powdery materials, etc., and when this food unit is then given the heat treatment as described herein, the fat coating 12 of various food pieces melts or softens so as to contact other food pieces in the unit, and thereby so as to form more or less of a skeleton formation 14, and this melted or softened fat even tends to produce a layer or reinforcement of fatty material on the outside portions of the unit, all of which tends to reinforce the food unit in order to result in a substantially more durable unit. The fat structure in Figure 2 is such that it does not act as a solid binding material for the food pieces but rather it takes the form of threads, films, and connecting pieces, so as to permit the sugar binding material to form and afford its own additional structure and strength to the food unit formation, by the crystallization of the sugar between these fat films and by other sugar strengthening bonds, and at the same time making possible the quick disintegration of the food unit upon cooking.

In Figure 3 the powdery or hygroscopic materials 13 are incorporated into a fat strip 16 which is laminated on to the brick or unit structure. The food pieces 19 are bound together by the continuous phase of the sugar binder 18.

Figure 4 shows the sugar binder 20 binding together the food pieces 21 as well as binding together at the same time, and intermixed therewith, congealed fat pieces 22, which fat pieces have interspersed therein hygroscopic, water reacting or powdery materials 23 so as to keep these materials from contacting the aqueous nature of the sugar syrup 20 in the manufacturing procedure.

Figure 5 is shown as a food unit of the nature indicated in Figure 1, but which food unit has been dipped or coated with a plastic fat or molten hard fat, or a similar water repellent material 24, so as to make a more durable brick and so as to provide further protective quality.

In Figure 6 there are shown diagrammatic drawings of food pieces 25 and 26, which are preferably of a low starch nature, and which have been exploded or otherwise treated so as to produce therein crevices, and interstices, etc. 27 into which the binding material 28 may flow, and thereby when the binding material sufficiently dries, hardens, crystallizes, or congeals etc., it will have substantially better anchorage and binding power in holding together the food pieces of the unit formation.

Figures 7 and 8 show diagrammatically, alternative embodiments of this invention with particular reference to the passageways and openings 32 that are around and between the food pieces 30, which food pieces are more or less round in Figure 7 and which are in more of a flake form in Figure 8. The binding material 31 which may be fat, although preferably, and in this embodiment, which is a sugar material acts so as to bind together these food materials at specific points rather than on their entire surfaces, so as to permit openings and spaces as large as possible for the entrance and passage of the water or aqueous materials that are used during the cooking procedure. This embodiment is particularly noted in Figure 8.

Figure 9 shows an embodiment of this invention in which the binding agent is a water-in-fat emulsion in which the sugar syrup droplets 34 are emulsified within the fat 35. This emulsified combination is then utilized as a new type of binding material for the food pieces 33, so as to prevent or retard the substantial contact of the aqueous sugar material directly with the food pieces.

Figure 10 shows a perspective view of a rectangular form of brick which is quite satisfactory to utilize according to the present invention. A unit construction in which the thickness dimension is relatively thin, is preferable for the embodiment of this invention, so as to permit the cooking water or aqueous material to more quickly disintegrate the food unit, and thereby to reduce lumping or caking etc.

Although the dimensions may be widely varied as is found most suitable, a thickness dimension 36 according to one embodiment of the present invention, varying from ⅜ to ½ of an inch, and a length dimension 37 varying from 1½ inches to 4 inches, and a width dimension 38 varying from 1 inch to 3 inches, may be used as desired.

In the circular form of brick shown in Figure 11, the thickness dimension 39 and the diameter also may vary as required.

Figures 12 and 13 show perspective and cross section views respectively of dome constructions of food units. The outstanding flange or fin 42, extending peripherally around the dome portion 41, may rest upon the bottom of the cooking pot or pan 43. The steam, or hot water bubbling, which will be generated in the cooking operation will rise as indicated by the arrow 40 into the dome 41 and will thereby produce a much more rapid disintegration of the food unit because the steam or water bubbles will tend to cause the unit to bounce and thereby to produce more movement so as to be more thoroughly and more quickly disintegrated.

In Figure 13, the flange 42 is beveled or rounded so that, in the cooking operation, as much of the body of the brick as possible is maintained free of contact with the bottom or walls of the cooking vessel 43. Also the flange may be made heavier than the dome portion, or the dome may be made heavier than the flange portion in order to provide for this unit falling into different positions, as required, during the cooking operation.

In Figure 13 are shown food pieces 44 which are included in this food unit formation, in accord with the embodiments as described herein.

In Figures 14 and 15 there are illustrated in cross sections, alternative embodiments in which part or none of the food materials are incorporated in the body portion itself, and the remainder, or all of the food pieces, are enclosed in a hollow within the unit formation itself.

For example, in the unit of Figure 14, the fin portion 47, which extends peripherally around the dome 46 may be molded or welded together at 45 by means of a molten hard fat, or by means of a sugar binder, or even by a pectin, starch, or dextrine, etc., binder. Also, if desired, all of the food materials may be incorporated in the body of the food unit, and only air, etc., allowed to remain in the hollow, and sealed therein, so as to produce aeration in the food unit and thereby to aid in the cooking process.

In the making of these encasements, they may be made in the usual way as described herein, as for example by coating the food pieces with a molten hard fat, in which is dispersed any hygroscopic or powdery materials, and then, after congealing the fat, molding or forming these food pieces into units by use of a sugar binder. However, if desired, the encasement may be made of a hard fat alone, or of a sugar alone, or of a mixture of hard fat and sugar, in emulsified form, for example, and particularly in the form of a syrup-in-fat type emulsion. However, if sugar alone is used for the making of this encasement, and even when it is used in conjunction with the fat, it should be, particularly when the food pieces are bound into the body of the unit, of a quickly disintegratable nature, as disclosed herein.

The various pieces of vegetables, meats, fish, cereals, powdered materials, spices, condiments, powdered milk, etc. 48 and 49 may be included within the enclosure between the two dome portions. Wherever powdery or hygroscopic materials are used, they should preferably be coated with a hard fat or water repellent material, or otherwise treated in accord with this invention so as to enable quick disintegration with minimum amount of lumping and caking, etc.

In Figure 15 instead of the two enclosures being of a dome construction, one of the sides of the hollow brick is made into a flat slab 51 which is bound at 50, to the flange 52 extending from the dome portion 53, with a binder material such as hard fat, sugar, starch, etc. The food particles 54 may consist of various types of food materials, preferably of a quick cooking nature.

In Figures 16 and 17 there are shown perspective views of a ridged type of brick or cake construction in which the brick is provided with a series of ridges indicated at 55 in Figure 16 and at 58 in Figure 17. The hollows 56 and 59 provide air spaces below the brick so that when it is boiled in water, there is permitted the improved disintegration action caused by the generation of steam, and by the water bubbling, below the brick, in the manner indicated by the arrow 40 of Figure 13.

Although merely a wedge is shown in Figure 17 terminating at the corner 60, it is possible to use the entire unit as part of a circular unit of which this is but one portion. Each portion may represent different types of breakfast foods or soups, so that a circular package may be made containing segments of different types of soups or breakfast foods, or other food varieties, or combinations of various food varieties.

In Figure 18 is shown a cross section view of an alternative embodiment in which two containers telescope into each other as indicated at 63. The body of these containers 61 and 62 may be formed, for example, of various food materials bound together as described herein, or they may be made wholly of other edible dissolvable or disintegratable materials and particularly those of quickly dissolvable materials as for instance molten hard fat, quick disintegratable sugar, or emulsions of sugar and fat, etc. If, for example, sugar alone is used in the formation of the container, the sugar formation may be such that there are many passageways and perforations 65 throughout the sugar, due to a structure of small crystals, so as to result in quick disintegration. The food pieces 64 may be enclosed between the two containers, or air may be included therein, etc. If desired, the overlapping portion of the cells may be sealed or melted together to form a positive union.

In Figure 19 is shown a perspective view of a carton 70, with the cover 71 lifted, and in the carton are contained 5 bricks, each of which will make several portions of a different type of soup. For example, this carton contains the ingredients in quickly disintegratable unit formation to make pea soup 72, cream of oatmeal soup 73, vegetable soup 74, beef broth 75, clam chowder 76. Particularly by the use of quick cooking materials, and quickly disintegrating unit formations, there may be made completed soups, without further proportionment, and without the usual difficulty, in periods of 5 or 6 minutes, whereas the usual time required for making soups may range from ½ hour to 2 hours.

In Figure 20, there is shown a perspective view of a carton 80 with the lifted cover 81 and in the carton there is found a row of briquetted units of breakfast food bases 82 for making the oatmeal base, farina base, or corn-meal base, and, in the other row there is found briquetted units 83 of prunes, raisins, and apricots, for further variety. This arrangement provides new economy and convenience in preparing various types of breakfast foods, along with various variations for these breakfast foods. The consumer may thereby make the breakfast food with whatever food variety addition is desired. For instance, the consumer may make a farina breakfast food and add for variety some raisins, by breaking off and adding a portion of the raisin brick, or if preferred, the consumer may similarly add some prunes, or some apricots, or a combination of these. This provides a new convenient variety usage for breakfast foods, and in fact this also permits the mixture of a portion of the oatmeal brick with a portion of the farina brick or the farina brick with the cornmeal brick, etc., as required, in order to provide new cereal combinations and variety, without the necessity of having available individual packages of many different materials.

What I claim is:

1. A bonded food unit comprising food pieces bound together by sugar, substantially each of the food pieces being coated with a water-repellent substance, said food unit being relatively quickly disintegratable in hot water, said water-repellent substance being relatively hard at room temperature.

2. A bonded food unit comprising food pieces bound together by sugar, substantially each of the food pieces being coated with a water-repellent substance, said food unit being relatively quickly disintegratable in hot water, said water-repellent substance carrying edible hygroscopic materials, and said water-repellent substance being relatively hard at room temperature.

3. A bonded food unit comprising food pieces bound together by sugar, substantially each of the food pieces being coated with a water-repellent substance, said food unit being relatively quickly disintegratable in hot water, said water-repellent material being at least partially interlaced within the food unit so as to improve the durable nature of the food unit.

4. A bonded food unit comprising food pieces bound together by sugar, substantially each of the food pieces being coated with a water-repellent substance, said food unit being relatively quickly disintegratable in hot water, said food unit having air sealed therein so as to enable buoyancy during cooking.

5. A bonded food unit comprising food pieces bound together by sugar, substantially each of the food pieces being coated with a water-repellent substance, said food unit being relatively quickly disintegratable in hot water, said water-repellent substance being relatively hard at room temperature and said water-repellent substance carrying therein a material capable of producing effervescence, said material being coated by the water-repellent substance and said material being attached to the food pieces so as to enable pressure to be formed between the solid food pieces when the effervescent material is contacted by the hot water which melts the water-repellent substance and unites with the effervescent material to produce effervescent pressure.

6. A bonded food unit comprising food pieces bound together by sugar, substantially each of the food pieces being coated with a water-repellent substance, said food unit being relatively quickly disintegratable in hot water, said sugar being a non-crystallizable sugar, and said water-repellent substance being relatively hard at room temperature.

7. A bonded food unit comprising food pieces bound together by sugar, substantially each of the food pieces being coated with a water-repellent substance, said food unit being relatively quickly disintegratable in hot water, said food pieces being exploded food pieces, pores and crevices of said exploded food pieces being impregnated with the water-repellent coating material.

8. A bonded food unit comprising food pieces bound together by sugar, substantially each of the food pieces being coated with a water-repellent substance, said food unit being relatively quickly disintegratable in hot water, said food pieces being of a small particle nature, and said food unit having channels and openings throughout so as to enable quicker entrance of water into the food unit.

9. The process of making a bonded food unit that is relatively quickly disintegratable in hot water, the food pieces of said food unit consisting substantially of relatively small particles, said process comprising coating substantially all of the food pieces with a water-repellent material, allowing said water-repellent material to congeal thereon, breaking up the water-repellent-coated food pieces so as to substantially separate them, and then mixing them with a sugar material and then forming into a desired food unit.

10. The process of making a bonded food unit that disintegrates relatively quickly in hot water, said process comprising coating substantially all of the food pieces of said unit with a water-repellent material, allowing said water-repellent material to congeal thereon, separating the coated food pieces where necessary, then mixing with an adhesive sugar material, and then forming into a desired food unit.

11. The process of making a bonded food unit that disintegrates relatively quickly in hot water, said process comprising coating substantially each of the food pieces of said unit with a water-repellent material, allowing said water-repellent material to congeal thereon, separating the coated food pieces where necessary, then mixing with an adhesive sugar material, then forming into the desired food unit, and then heating the food unit at a temperature above the melting point of the water-repellent material, and then congealing the water-repellent material.

ALBERT MUSHER.